United States Patent
Luo et al.

(10) Patent No.: US 10,666,685 B2
(45) Date of Patent: *May 26, 2020

(54) SERVICE ORIENTED SOFTWARE-DEFINED SECURITY FRAMEWORK

(71) Applicant: Accenture Global Solutions Limited, Dublin (IE)

(72) Inventors: Song Luo, Gaithersburg, MD (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,490

(22) Filed: Nov. 5, 2018

(65) Prior Publication Data
US 2019/0158538 A1    May 23, 2019

Related U.S. Application Data

(63) Continuation of application No. 15/177,103, filed on Jun. 8, 2016, now Pat. No. 10,135,871.
(Continued)

(51) Int. Cl.
*H04L 29/06* (2006.01)
*H04L 12/24* (2006.01)

(52) U.S. Cl.
CPC .......... *H04L 63/20* (2013.01); *H04L 63/02* (2013.01); *H04L 63/0227* (2013.01); *H04L 41/12* (2013.01); *H04L 63/1408* (2013.01)

(58) Field of Classification Search
CPC ..... H04L 63/20; H04L 63/02; H04L 63/0227; H04L 41/12; H04L 63/1408
See application file for complete search history.

(56) References Cited

U.S. PATENT DOCUMENTS

| 6,044,469 A | 3/2000 | Horstmann |
| 7,308,702 B1 | 12/2007 | Thomsen et al. |

(Continued)

FOREIGN PATENT DOCUMENTS

WO    WO 2014/116446    7/2014

OTHER PUBLICATIONS

Australian Office Action in Application No. 2016203880, dated Jul. 12, 2016, 6 pages.
(Continued)

*Primary Examiner* — Ghodrat Jamshidi
(74) *Attorney, Agent, or Firm* — Fish & Richardson P.C.

(57) ABSTRACT

Methods, systems, and apparatus, including computer programs encoded on a computer storage medium, for service oriented software-defined security framework are disclosed. In one aspect, a system includes a security control device, one or more assets, and a security controller that communicates with the security control device and the one or more assets. The security controller includes a processing engine configured to register the security control device by creating a physical-logical attribute mapping for the security control device, and generating a security service description associated with the security control device. The processing engine is further configured to register the one or more assets by creating a physical-logical attribute mapping for each of the one or more assets, and generating security service requirements for each of the one or more assets. The processing engine is further configured to generate a security service binding based on a request for service.

20 Claims, 16 Drawing Sheets

Related U.S. Application Data

(60) Provisional application No. 62/174,990, filed on Jun. 12, 2015, provisional application No. 62/342,128, filed on May 26, 2016.

(56) References Cited

U.S. PATENT DOCUMENTS

| | | | |
|---|---|---|---|
| 8,433,069 B2 | 4/2013 | Noda | |
| 8,478,977 B1 | 7/2013 | Smith et al. | |
| 8,590,004 B2* | 11/2013 | Comay | H04L 63/20 726/1 |
| 9,047,470 B2 | 6/2015 | Rados | |
| 9,069,599 B2 | 6/2015 | Martinez et al. | |
| 9,210,194 B2 | 12/2015 | Porras | |
| 10,043,030 B1* | 8/2018 | Kruse | G06F 21/6245 |
| 10,313,346 B1* | 6/2019 | O'Neill | H04L 63/0263 |
| 2003/0061482 A1 | 3/2003 | Emmerichs | |
| 2003/0154401 A1* | 8/2003 | Hartman | H04L 63/102 726/30 |
| 2003/0195962 A1* | 10/2003 | Kikuchi | H04L 29/06 709/226 |
| 2006/0067209 A1* | 3/2006 | Sheehan | H04L 29/08846 370/216 |
| 2006/0112427 A1 | 5/2006 | Shahbazi | |
| 2006/0141985 A1* | 6/2006 | Patel | H04L 63/20 455/410 |
| 2006/0277595 A1* | 12/2006 | Kinser | G06F 21/6218 726/3 |
| 2006/0282886 A1 | 12/2006 | Gaug | |
| 2007/0169080 A1* | 7/2007 | Friedman | G06F 8/65 717/168 |
| 2008/0065466 A1 | 3/2008 | Liu et al. | |
| 2009/0164780 A1* | 6/2009 | Murayama | G06F 3/0604 713/165 |
| 2010/0254279 A1* | 10/2010 | Choi | H04L 43/0882 370/252 |
| 2011/0131252 A1* | 6/2011 | Son | H04L 41/0893 707/803 |
| 2012/0185913 A1 | 7/2012 | Martinez et al. | |
| 2012/0314624 A1 | 12/2012 | Asati | |
| 2013/0019315 A1 | 1/2013 | Chen et al. | |
| 2013/0276053 A1 | 10/2013 | Hugard, IV et al. | |
| 2014/0331309 A1 | 11/2014 | Spiers | |
| 2014/0359749 A1 | 12/2014 | Rieke et al. | |
| 2015/0089061 A1* | 3/2015 | Li | H04W 4/70 709/226 |
| 2015/0089572 A1 | 3/2015 | He et al. | |
| 2016/0234686 A1* | 8/2016 | Bone | H04W 88/02 |
| 2016/0308905 A1* | 10/2016 | Stiekes | H04L 47/20 |

OTHER PUBLICATIONS

Extended European Search Report in Application No. 16173906.5, 14 pages.

Australian Office Action for Application No. 2016203880, dated Oct. 17, 2016, 5 pages.

Riad et al., "Design of SOA-based Grid Computing with Enterprise Service Bus", International Journal on Advances in Information Sciences and Service Sciences, vol. 2, No. 1, published Mar. 31, 2010, pp. 71-82.

European Office Action for Application No. 16173906.5, dated Sep. 19, 2017, 8 pages.

European Office Action for Application No. 16173906.5, dated Mar. 1, 2018, 9 pages.

IN Office Action in Indian Application No. 201644019886, Jan. 31, 2020, 6 pages.

* cited by examiner

SERVICE ORIENTED SOFTWARE-DEFINED SECURITY FRAMEWORK

CROSS REFERENCE TO RELATED APPLICATIONS

This application is a continuation (and claims the benefit of priority under 35 USC 120) of U.S. application Ser. No. 15/177,103, filed Jun. 8, 2016, now allowed, which claims the benefit of U.S. Provisional Application No. 62/174,990, filed Jun. 12, 2015, and U.S. Provisional Application No. 62/342,128, filed May 26, 2016. All of these applications are incorporated by reference in their entirety.

TECHNICAL FIELD

This application relates to network security.

BACKGROUND

As enterprises IT infrastructures become more virtualized, cloud-based, and fast changing, traditional cyber security cannot adapt well to this trend since it is tied to static network identities and relies on stateful devices. One example is an IP based stateful firewall in a cloud; it will not perform as expected if any protected virtual machine has changed its IP address due to cloud operations.

The traditional approach to performing security configuration largely relies on manual work. In addition, since many security controls use assets' physical attributes in their configurations, when the assets' physical attribute changes, it requires a lot of manual work to identify other assets and controls that are impacted by that change and to modify relevant configurations. When a new device is added to the network or an existing device is removed, it also requires manual changes to security control configurations.

SUMMARY

This application relates to a service-oriented approach to security controlling for software-defined infrastructure. This approach adopts software-defined security principles. It represents security controls as security services, and interprets assets' security policies as service requirements. This approach supports security management and control at a supervisory level and shields them from the underlying infrastructure and its dynamic changes. This approach helps enforce consistent security policies across heterogeneous cloud-based or traditional environments and simplifies security management tasks for network administrators. This application describes a prototype that implements a service-oriented approach to software-defined security and discuss several practical use cases for this approach.

Many enterprises may transform their traditional IT infrastructure into Software-Defined Infrastructure (SDI). Among the main characteristics of SDI is the adoption of software-defined networking, software-defined storage, server virtualization, and automation and control software. These technologies make SDI a highly dynamic environment in which IT assets and functions are defined, created, modified, and recycled in an on-demand manner. This dynamic nature of SDI may cause difficulty for cyber security operations, which traditionally rely on dedicated hardware appliances. Dedicated security appliances may be tied to static infrastructure settings such as a fixed network topology and fixed IP addresses. The dependence on static settings makes it difficult to modify existing security mechanisms or deploy new ones, because such changes often trigger cascading effects and involve intensive manual reconfigurations. Furthermore, using dedicated and proprietary appliances causes vendor lock-in, and results in higher costs and a greater risk at both the business and the operation levels. In order to achieve more flexible, more agile, and automated cyber security operations in SDI environments, it may be desirable to minimize security management's dependence on static and proprietary security appliances.

This application describes an approach, Service-Oriented Software-Defined Security (SOSDSec), that decouples cyber security management from the underlying security controls, by representing proprietary security functions as generic security services. SOSDSec uses techniques such as transformation (which can also be referred to as abstraction and/or formulation), API enablement, automation, and orchestration. In SOSDSec, security services can be discovered, enabled, and disabled on-demand. SOSDSec offers benefits to enterprise cyber security including simplified management and control, technology and vendor agnosticism, support for infrastructure dynamics, and increased agility. Described below are example security control approaches for software-defined infrastructures using modified security services.

Software-Defined Security (SDSec) is an architectural approach to improve security within SDI environments. The core principles of SDSec include transformation, automation, control, scalability, flexibility, visibility, and API enablement. It delivers security functions with software instead of traditional physical security controls, inherently simplifying security management tasks. Eliminating the dependencies on hardware also means that security can be deployed in tandem with the changing levels of virtualized cloud infrastructure.

According to an innovative aspect of the subject matter described in this application, a software defined security system includes a security control device; one or more assets; and a security controller that communicates with the security control device and the one or more assets. The security controller includes a processing engine configured to register the security control device by creating a physical-logical attribute mapping for the security control device, and generating a security service description associated with the security control device. The processing engine is also configured to register the one or more assets by creating a physical-logical attribute mapping for each of the one or more assets, and generating security service requirements for each of the one or more assets. The processing engine is also configured to generate a security service binding based on a request for service, wherein the processing engine is operable to translate the security service binding into a set of security control commands and communicate the security control commands to the security control device.

The software defined security system may include one or more of the following optional features. The security control device is one of a firewall, an intrusion detection system, and an identity and access management system. The one or more assets include one of a server, a VPN client and server, an external computing device, and a mobile computing device. The processing engine may be further configured to receive data identifying a security event; access a playbook that identifies one or more actions for the security controller to perform for the security event; and perform the one or more actions in response to the security event. The security event may include an event from an intrusion detection control, a network topology change, or a server failure. The action of generating the security service binding may include preforming the one or more actions in response to the security event. The physical-logical attribute mapping for the security control device may include an IP address-hostname mapping for the security control device. The physical-logical attribute mapping for each of the one or more assets may include an IP address-hostname mapping for each of the one or more assets. The processing engine may be further configured to receive data indicating a change to a physical attribute of one of the one or more assets. In response to receiving the data indicating the change to the physical attribute of the one of the one or more assets, the processing engine may identify a security service requirement for the one of the one or more assets, and the processing engine may generate a security service binding for the one of the one or more assets based on the security service requirement for the one of the one or more assets. The security service binding for the one of the one or more assets may be generated automatically and without user input after receiving the data indicating the change to the physical attribute of the one of the one or more assets.

Other implementations of this aspect include corresponding systems, apparatus, and computer programs recorded on computer storage devices, each configured to perform the operations described.

According to another innovative aspect of the subject matter described in this application, a method includes the actions of registering, by a security controller that communicates with a security control device and one or more assets, the security control device by creating a physical-logical attribute mapping for the security control device, and generating a security service description associated with the security control device; registering the one or more assets by creating a physical-logical attribute mapping for each of the one or more assets, and generating security service requirements for each of the one or more assets; generating a security service binding based on a request for service; translating the security service binding into a set of security control commands; and communicating the security control commands to the security control device.

The method may include one or more of the following optional features. The security control device is one of a firewall, an intrusion detection system, and an identity and access management system. The one or more assets include one of a server, a VPN client and server, an external computing device, and a mobile computing device. The actions further include receiving data identifying a security event; accessing a playbook that identifies one or more actions for the security controller to perform for the security event; and performing the one or more actions in response to the security event. The security event may include an event from an intrusion detection control, a network topology change, or a server failure. The action of generating the security service binding may include preforming the one or more actions in response to the security event. The physical-logical attribute mapping for the security control device may include an IP address-hostname mapping for the security control device. The physical-logical attribute mapping for each of the one or more assets may include an IP address-hostname mapping for each of the one or more assets. The actions may further include receiving data indicating a change to a physical attribute of one of the one or more assets; in response to receiving the data indicating the change to the physical attribute of the one of the one or more assets, identifying a security service requirement for the one of the one or more assets; and generating a security service binding for the one of the one or more assets based on the security service requirement for the one of the one or more assets. The security service binding for the one of the one or more assets may be generated automatically and without user input after receiving the data indicating the change to the physical attribute of the one of the one or more assets.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
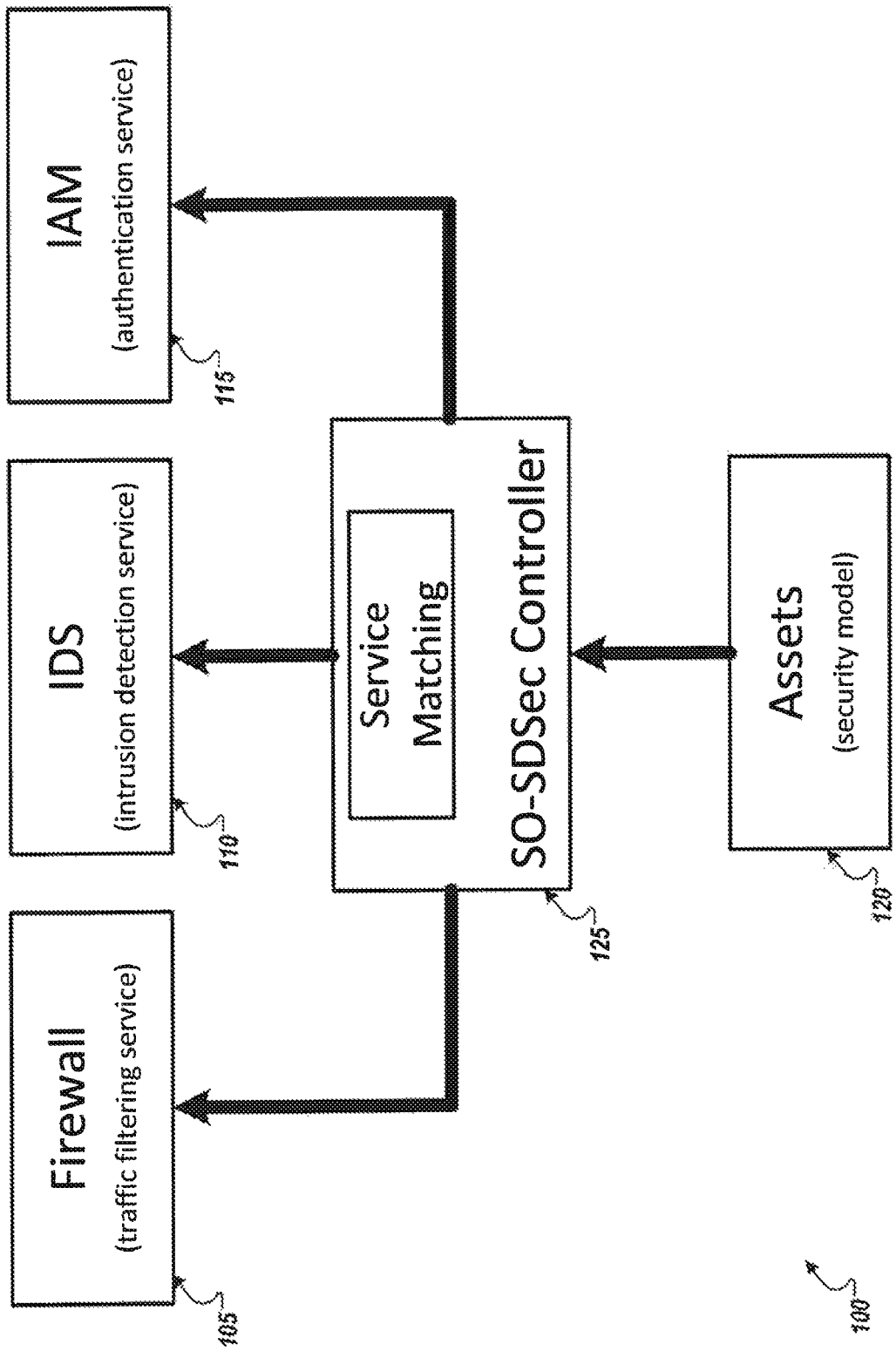
FIG. 1 illustrates an example service matching process between an asset and security service providers.

FIG. 1 illustrates an example service matching process 100 between an asset and security service providers. The service matching process 100 operates within the context of an enterprise IT infrastructure, which is typically comprised of security controls (to include for example firewalls 105, intrusion detection systems ("IDS") 110, and identity and access management ("IAM")) and assets (to include protected internal servers 115, VPN client and server, and external clients). In the example shown in FIG. 1, an asset 120 requests three different security services from a firewall, an IDS, and an IAM, through a SOSDSec controller 125 running a service matching algorithm.

The SOSDSec controller 125 provides cyber security management by defining security controls' capacities as security services, and assets' security policies/modes as security service requirements. Thus, the process of configuring security controls for protected assets becomes the process of binding assets' security requirements to available security services in a given network domain, and translating such bindings into actual commands for security controls.

All security controls can be described as service providers who provide certain security functionalities to be used by other parties in a certain network scope. For example, the firewall 105 at a LAN can be described as a traffic filtering service provider that can block unwanted traffic to protected servers in the same LAN. In this case, protected servers are service consumers, each with its own particular security requirements that describe which traffic it wants to block (or accept). Each server requests the same traffic filtering service from the firewall but with different parameters, which result in different traffic being filtered for each server. Similarly, a network-based intrusion detection device 110 provides intrusion detection service for all assets in the network it protects. A host-based intrusion detection system is a service provider whose customer is the same computer running it. Security services can also be provided to external entities, such as mobile devices used by employees outside the enterprise premise. In this case, the mobile devices need to authenticate themselves first, and their security requirements will be retrieved from a user information repository, and SOSDSec then searches needed services for authenticated mobile devices. Authorizations of those mobile users come from proper specification of their security service requirements.

Figure 1A:
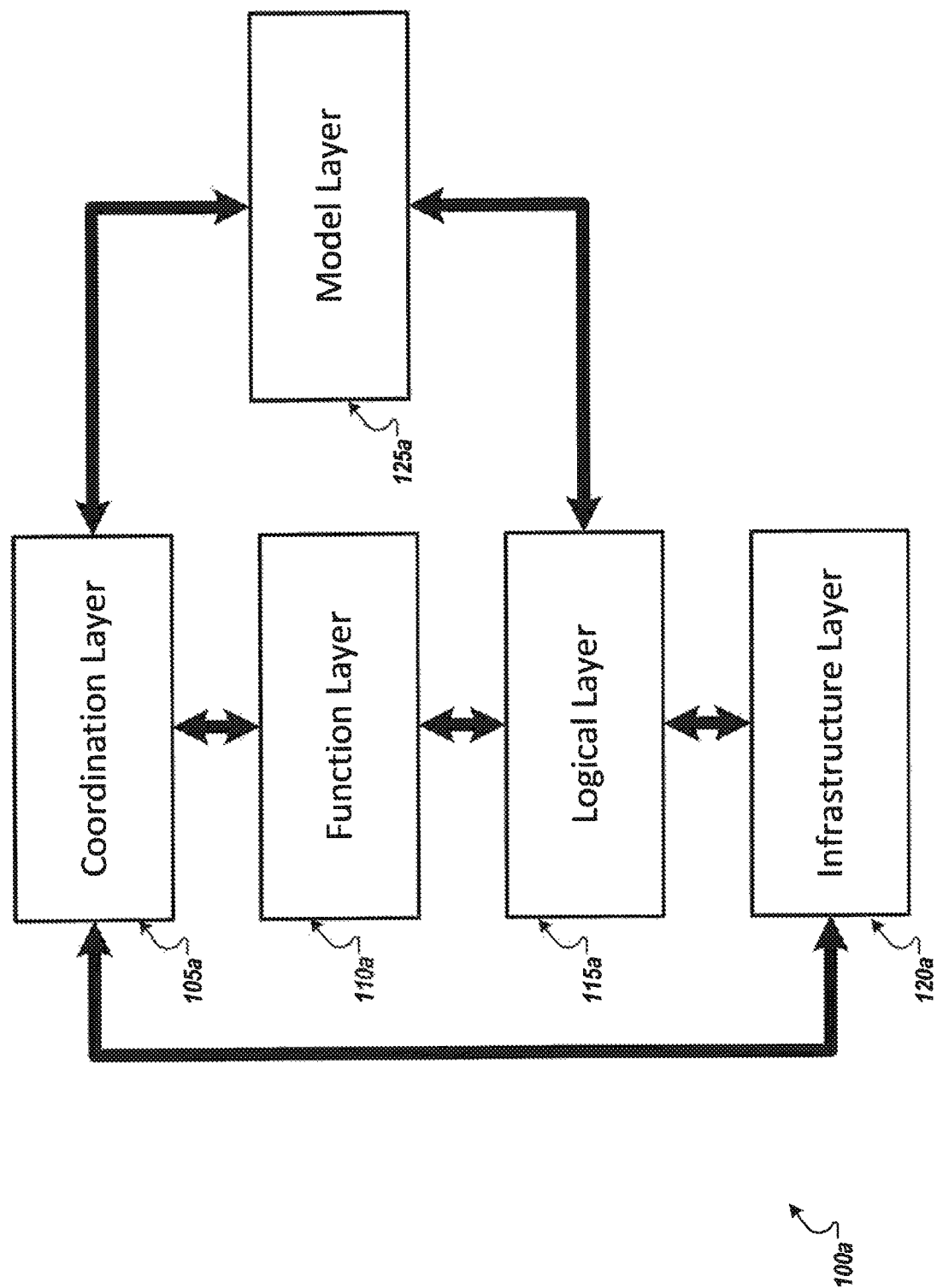
FIG. 1A illustrates an example software-defined security model that is decomposed into several layers that are aligned to an example software-defined environment.

FIG. 1A illustrates an example software-defined security model 100a that is decomposed into several layers that are aligned to an example software-defined environment. In some implementations, the coordination layer 105a includes a SOSDSec controller. The controller reads and updates assets' security models. The controller also communicates with software- and hardware-based security controls and other virtualized functions to coordinate security tasks, in order to enforce assets' security models. The controller, together with its communication and coordination subsystems, are elements for achieving security automation and orchestration. The software-defined security model 100a includes an Infrastructure Layer 120a, which includes physical/virtual infrastructure. The hardware-based security controls also belong to this layer 120a. The Logical Layer 115a maintains the logical attributes of all resources, such as their logical references (host identities, references to applications, etc.). In some implementations, these may not include transient identities such as IP addresses. The Function Layer 110a manages all virtualized functions including Software-Defined Networking (SDN), Software-Defined Storage (SDS), Software-Defined Perimeter (SDP), and other NFV. The layer 110a also includes all customized software-based security controls. The Model Layer 125a manages assets' security policies and security models. An asset's security model is a set of rules derived from applicable security policies. These rules rely on assets' logical attributes, and thus may not be affected by the changes in the underlying infrastructure.

Figure 2:
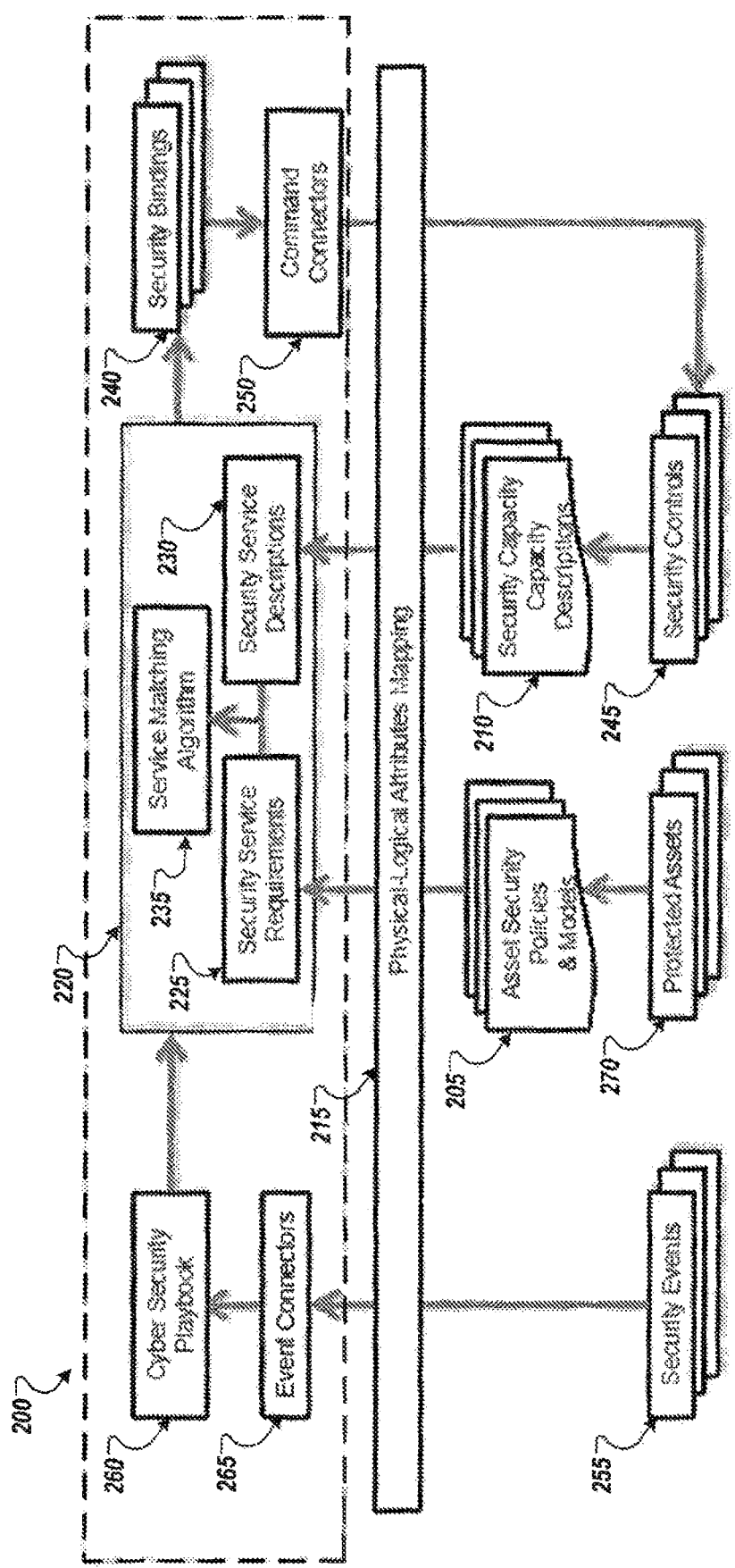
FIG. 2 illustrates an example architecture of a Service-Oriented Software-Defined Security controller and its functional elements.

FIG. 2 illustrates an example architecture of a Service-Oriented Software-Defined Security controller 200 and its functional elements. The Service-Oriented Software-Defined Security controller 200 interfaces with assets and security controls within the network and provides physical-logical attribute mapping and service matching to bind asset service requests to appropriate security control(s).

The SOSDSec controller 200 is designed to address security issues of virtual and/or software-defined infrastructures. It is similar to SDSec because it transforms security controls into generic security services. Assets become security service consumers and specify their service requirements based on their own security needs; security controls become service providers that accommodate assets with generic security capabilities. Because SOSDSec manages security at the supervisory service level, instead of directly on security appliances, SOSDSec-based security solutions are technology-independent and vendor-agnostic. In addition, by using assets' logical identities, SOSDSec makes infrastructural dynamics, such as VM movement, transparent to security management.

The Service-Oriented Software-Defined Security controller 200 contains a database of each asset's one or more asset security policy and model 205. These models 205 provide a description of the security requirements, policies, and models that the asset 270 requires for the security protections it needs. In some implementations, security policies and models are manually defined or aided by third party or custom-made software tools. The controller 200 also includes a database of each security control's one or more security control capacity description 210, which describes the security control's type, input, functionality, output, and control scope. For example, a capacity description of a firewall in a LAN will specify that it is a traffic filtering device, it will take incoming traffic as input, it applies filtering rules to its inputs, and it will deny or allow certain traffic to pass through, its output are various alerts depending on its configurations, and its control scope is the same LAN as that in which it operates. In some implementations, the models and descriptions 205 and 210 are predefined, typically manually (e.g., by a system administrator), and correspond to the assets and controls that the network supports. Third party or custom-made tools can also be used to automate this process. The overall framework takes a service-oriented approach to managing cyber security, in which security controls are described as service providers of their security functionalities, and assets are described in terms of their security service requirements.

The controller 200 provides a physical-logical attribute mapping 215 of all assets and controls. In some implementations, each asset and security control must register with the security controller. Through that registration process, the security controller maps the asset or control's logical attribute (e.g., hostname) to its physical attribute (e.g., IP address). Once the mapping is complete, each asset will have corresponding security service requirements, derived from the asset's security policy and model and mapped to the logical attribute of the asset. Likewise, each security control will have a corresponding security service description, derived from its security control capacity description and mapped to the logical attribute of the control. In some implementations, for example, non-SOSDSec implementations, the IP and domain name mapping is managed by the network's DNS server, but it cannot be efficiently integrated with other SDI/SDSec components. Central management by the SDSec framework provides for quick access and easy integration with other SDI/SDSec components.

The controller 200 includes a service matching engine 220 that includes security service requirements 225 and security service descriptions 230 that are provided to a service matching algorithm 235, and the service matching algorithm then provides security service bindings 240 as an output. The security controller's service matching engine 220 binds service requests from assets to services provided by security control devices (e.g., firewalls, intrusion detection systems, identity, and access management). The matching engine 220 examines each asset's security service requirements. The matching engine 220 executes a service matching algorithm or process in which it searches available security control capacity descriptions. Once it finds a match between a service requirement (asset) and a security service (control), the matching engine generates a security service binding. The security controller then sends pertinent commands to various security controls 245 through the command connector 250 to the appropriate security control 245 to enable the security service binding and fulfill the security requirement of the one or more assets.

In more detail, security service requirements 225 are documents derived from asset security policies and models. Each asset will have one corresponding security service requirement document, which contains formal descriptions of its requirements for one or more security services. The security service descriptions 230 are documents derived from security control capacity descriptions. Each security control will have one corresponding security service description, which describes its security capacity as one or more services to be used by other entities. It defines a formal service name for each of its security capacities, with associated capacity and scope parameters. The service matching algorithm 235 receives service requirements from assets and searches satisfying security services in the managed IT infrastructure. The algorithm matches service name, type, input, and control scope to make sure the requirements and services are consistent in these aspects. Once a match between a service requirement and a service is found, the controller 200 generates a security service binding 240, which, in some implementations, has all necessary information from both the service requirement and the service description. The binding 240 may also have additional information such as how long this binding will last, who is the administrator, etc. The binding 240 can change after it is generated when its underlying security model or security control's capacity changes. The command connectors 250 are a set of interfaces that send commands to various security controls through their API. The commands are generated according to the security service bindings. The commands usually modify security controls' configurations and change their operational behavior. These commands fulfill assets' security requirements.

In some implementations, the security controller 200 may also react to networking and security events 255. In these cases, the event will be forwarded through event connectors 265 to a playbook 260, which contains a list of plans for important events. Based on the plans in the playbook 260, the matching engine 220 may change an asset's service requirement, a security control's service description, or modify existing security service bindings.

In more detail, the event connectors 265 are a set of interfaces that receive networking and security events 255 from various external information sources. When an event connector interface receives an event, it forwards the event to the playbook 260 for further processing. The playbook 260 contains plans for important events on which security administrators should take actions. Those events could be alerts from intrusion detection controls, network topology changes, or server failures, depending on the enterprises' IT security policies and guidelines. The plans are specified with service-related operations, such as changing asset's service requirements, changing security controls' service descriptions, or modifying current security service bindings.

By taking a service-oriented approach, the software defined security controller 200 enables networks to overcome existing limitations in managing cyber security in a virtualized IT infrastructure. Security requirements are automatically matched to available services, which eliminates the need for manual configuration of security controls based on physical attributes of assets. This provides many benefits to cyber security systems such as increased flexibility, reduction of complexity in management, and enhanced scalability of the network.

For example, in one implementation, an asset 270 such as an internal server (or the functions provided by that internal server) may move from a corporate IT office to the cloud. Such a move will cause a physical attribute of that server (e.g., the asset's IP address) to change. Using the above described framework, once the asset registers with the security controller, the security controller will automatically update the physical-logical attribute mapping. Furthermore, because the software defined security operates via logical attributes, once the physical-logical attribute mapping is updated, the move is seamless—the service matching engine 220 updates the match between the asset service requirement and security service, and sends commands to those relevant security controls to reflect the asset's updated physical attribute. And if the asset (or assets) requires additional security controls (e.g., secondary firewall due to a move to the cloud), the service matching engine 220 will create an additional security service binding to configure the relevant controls for the updated physical arrangement of assets.

The Service-Oriented Software-Defined Security controller 200 provides several benefits and advantages. The framework not only decouples assets and security controls' logical attributes from their physical attributes, but also decouples assets' security requirements from security control's capacity. This approach is an effective way to implement software-defined security, and can bring following advantages to security management.

One advantage is portable security for digital assets. A benefit of this approach is that the security requirements are decoupled from security services, which allows assets to carry their security requirements and models with them while dynamically changing their physical attributes. This is particularly advantageous in cloud-based IT infrastructure, where the same logical asset might be instantiated at different network locations. Instead of manually setting up security configurations when assets move to new locations, this approach allows for automatic matching of assets' security requirement to available security services. Once a match is successful, specific security configurations can be obtained from the corresponding service binding, and automatically applied to security controls.

Another advantage is reduced complexity of security management. The SOSDSec controller reduces complexity of security maintenance. Changes to assets' security policies and models can be accomplished by adjusting assets' security service requirements. Changes to a security control functions can be accomplished by adjusting the control's service capacity description. With SOSDSec, administrators usually do not need to directly modify security control's configurations, which is time consuming and error-prone. Instead, after human administrators adjusted service requirements or service capacity description, SOSDSec can automatically modify impacted service bindings, and apply derived security configurations on relevant security controls.

Another advantage is increased flexibility of adopting different security technologies and controls. The SOSDSec controller transforms security control's functions as security services, and decouples the security services from the implementing technologies. This brings the benefits that the same security service description can be used for security controls implemented with different technologies, or produced by different companies. As long as their security functions are the same or similar, administrators can deploy anyone without the need to modify the service description. It gives security administrators more flexibility to use different security technologies and products, and avoid vendor lock-in.

Another advantage is increased agility in security incident response. By using automatic requirements-service matching, SOSDSec can automate many security operations which require manual work traditionally. It speeds up the response time of security incidents and improves organizations' cyber agility.

Another advantage is adapting to changing threat landscape. Using SOSDSec, administrators can change asset's security requirements without considering how to correspondingly change security control's configurations. SOSDSec can quickly and automatically modify relevant security controls' configurations. When connecting the security requirement adjustment to external/internal threat landscapes, SOSDSec can automatically adjust ITs cyber security to defend against new and evolving threats.

Another advantage is improved scalability of cyber security. SOSDSec implements software-defined security, and allows most security provisioning, management, and configuration tasks to be accomplished by software. This allows deployment and configuration of a large number of security controls in a short time, which improves the scalability of cyber security.

In some implementations, security controls of the same type usually have similar capabilities, and their functions can be described by the same transformed service. For example, in a SOSDSec implementation, a first type of firewall and a second type of firewall can be transformed to and represented as the same Firewall Service. SOSDSec further transforms and represents all different types of security controls into a common Security Service.

Figure 2A:
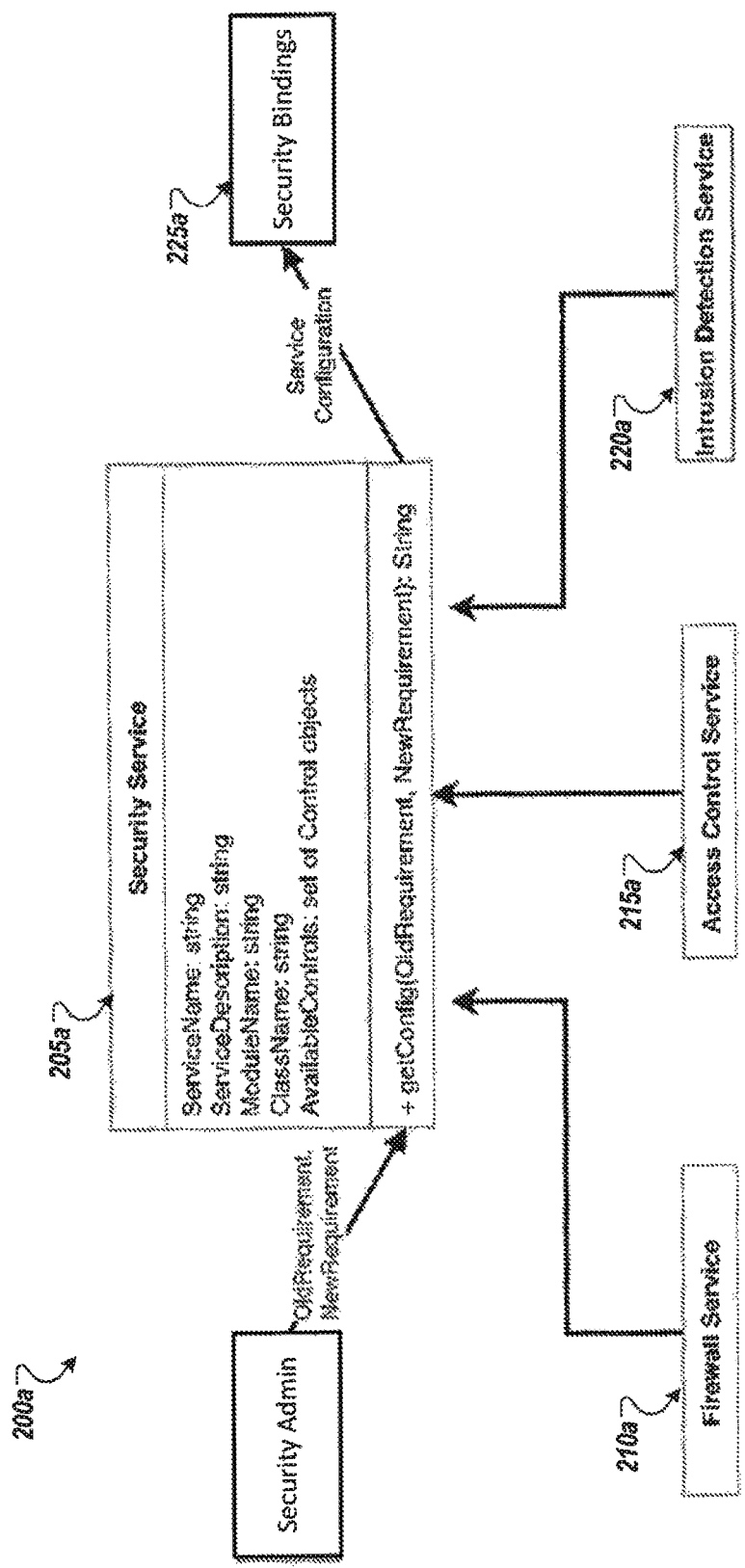
FIG. 2A illustrates an example class diagram of a Security Service.

FIG. 2A illustrates the class diagram 200a of an example security service 205a. The security service's subclasses implement a Firewall Service 210a, an Access Control Service 215a, and an Intrusion Detection Service 220a. The transformed Security Service class defines only a few common fields including ServiceName, ServiceDescription, ModuleName, ClassName, AvailableControls. ModuleName and ClassName refer to the module name and class name for SOSDSec to dynamically load the class source code. It is also a possible way to integrate with third party service implementations. AvailableControls is a set of runtime control objects that provide this type of service.

In SOSDSec, security services expose transformed interfaces based on logical identities. Security management is built upon the common APIs of transformed services. Also in SOSDSec, security administrators prepare a list of service requirements for each asset to be protected. The requirement list can be derived from existing security models and policies. An asset could be a virtual or physical server, an application, a database, a set of files, etc. Each requirement specifies one security service needed and its parameters.

Figure 2B:
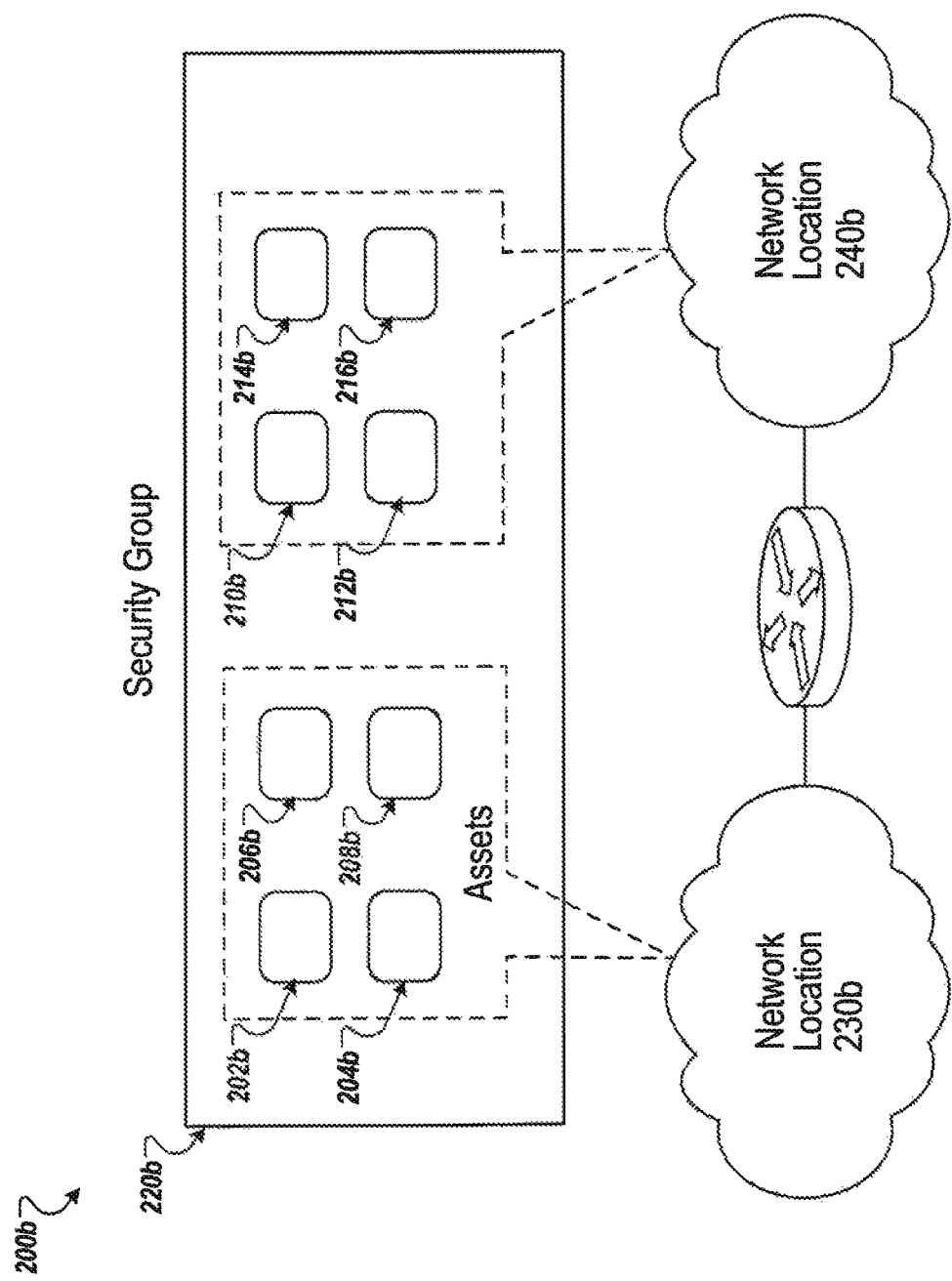
FIG. 2B illustrates example assets that are in the same security group and that may belong to different virtual or physical networks.

Assets are organized into security groups. Assets in the same group share the same security service requirements. FIG. 2B illustrates an example system 200b where example assets 202b-216b that are in the same security group 220b and that may belong to different virtual or physical networks 230b or 240b. SOSDSec may only use their logical identities, which are free of any physical attributes such as IP address and network location. This means that the management of security requirements in SOSDSec will not be affected by changes to assets' physical attributes. For example, when an asset, e.g., asset 204b, moves from network location 230b to network location 240b, security administrators do not need to adjust its security policy and do not have to make manual changes to security controls in either networks, as long as it remains in the same security group 220b. This is because the security management at the supervisory level is unchanged. Only relevant security service bindings that tie assets and controls together need to perform necessary operations to keep the moving asset's security requirements fulfilled. The security service bindings are described below.

When an asset needs a security service, SOSDSec searches security controls in the infrastructure that provide the required service. For this purpose, each security control needs to declare what security services it offers, and the security administrator needs to register each deployed security control and its supported services, along with other relevant information, into the SOSDSec control database. Once all controls are registered, the service matching becomes a process of searching for required service in the database under certain criteria. SOSDSec can use a variety of matching algorithms, such as schema-based or ontology-based matching algorithms. An example implementation may use exact name matching as a search method.

Once the SOSDSec controller matches security requirements to appropriate available security services, it creates security service bindings to connect protected assets to the corresponding security controls. A service binding is an interface that directs service requests of a set of assets with common security requirements to a particular security control that provides such requested protection. Security service bindings also respond to infrastructure dynamics and management commands by transparently performing appropriate security operations on security controls. Service bindings ensure that the security requirements of its associated assets are still fulfilled after each operation.

Figure 2C:
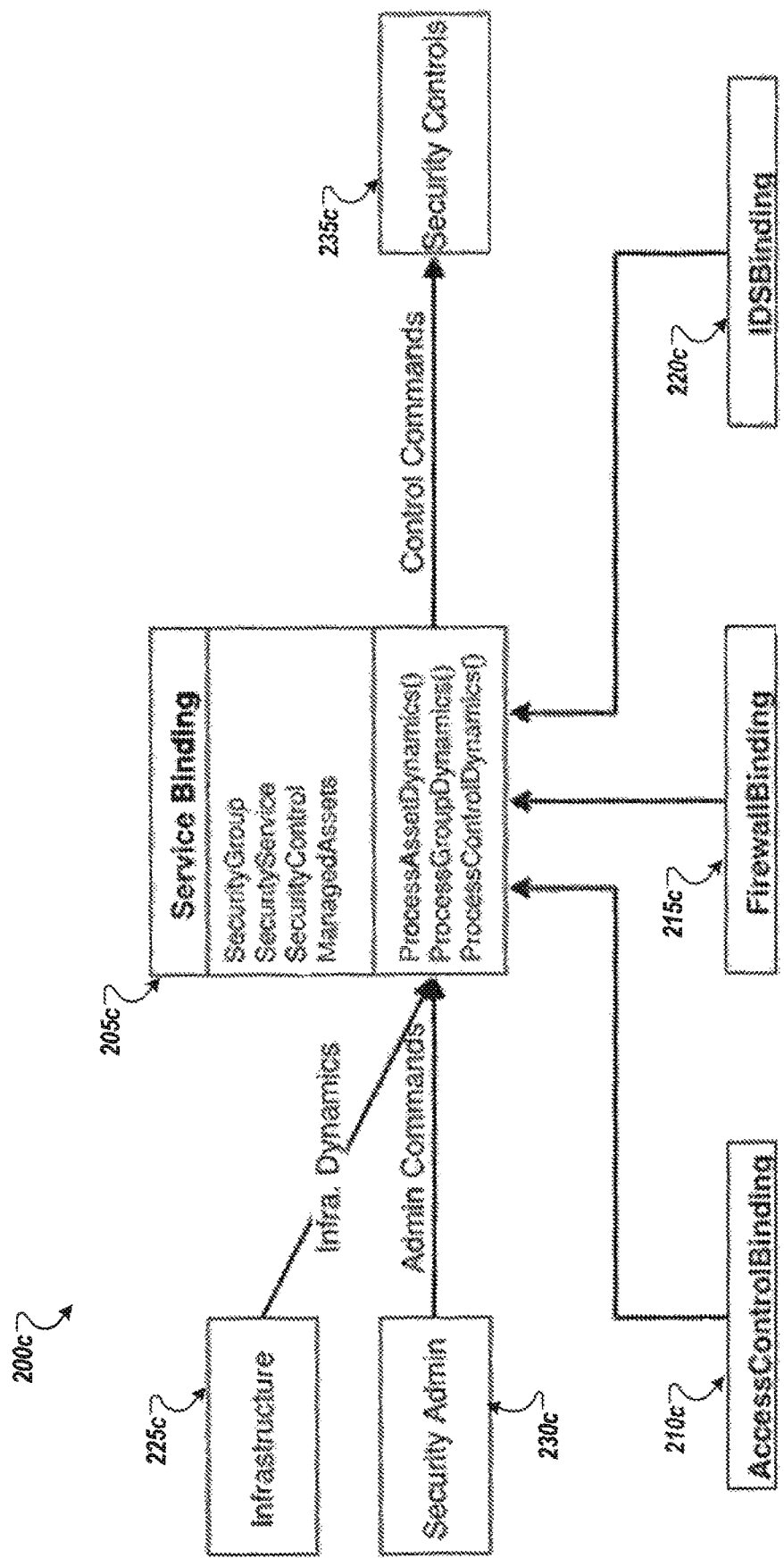
FIG. 2C illustrates an example class and message diagram of the Security Service Binding class and three sub-classes.

FIG. 2C illustrates an example class and message diagram 200c of the Security Service Binding class and three subclasses. In SOSDSec, each service defines its own service binding class, that implements how this type of service binding should respond to a variety of dynamics. Service bindings receive updates in JSON messages and generate appropriate control commands in response to each update. Then, they send those commands to security controls to modify control configurations. In some implementations, SOSDSec responds to three types of infrastructure or management, for example, asset updates, group updates, and control updates. Asset updates include adding, deleting, or moving assets among security groups, and adding, deleting, or moving assets in networks. Group updates include adding or deleting security groups. Control updates include adding or deleting security controls in the infrastructure.

In the example show in FIG. 2C, the service binding class 205c is a super class of several sub-classes such as an access control binding class 210c, a firewall binding class 215c, an IDS binding class 220c. Based on the infrastructure dynamics from the infrastructure 225c and the administration commands from the security administration 230c, the service binding class 205c selects a command, for example, ProcessAssetDynamics( ), ProcessGroupDynamics( ), or ProcessControlDynamics( ). The service binding class 205c sends the selected command to a security control 235c.

Figure 3:
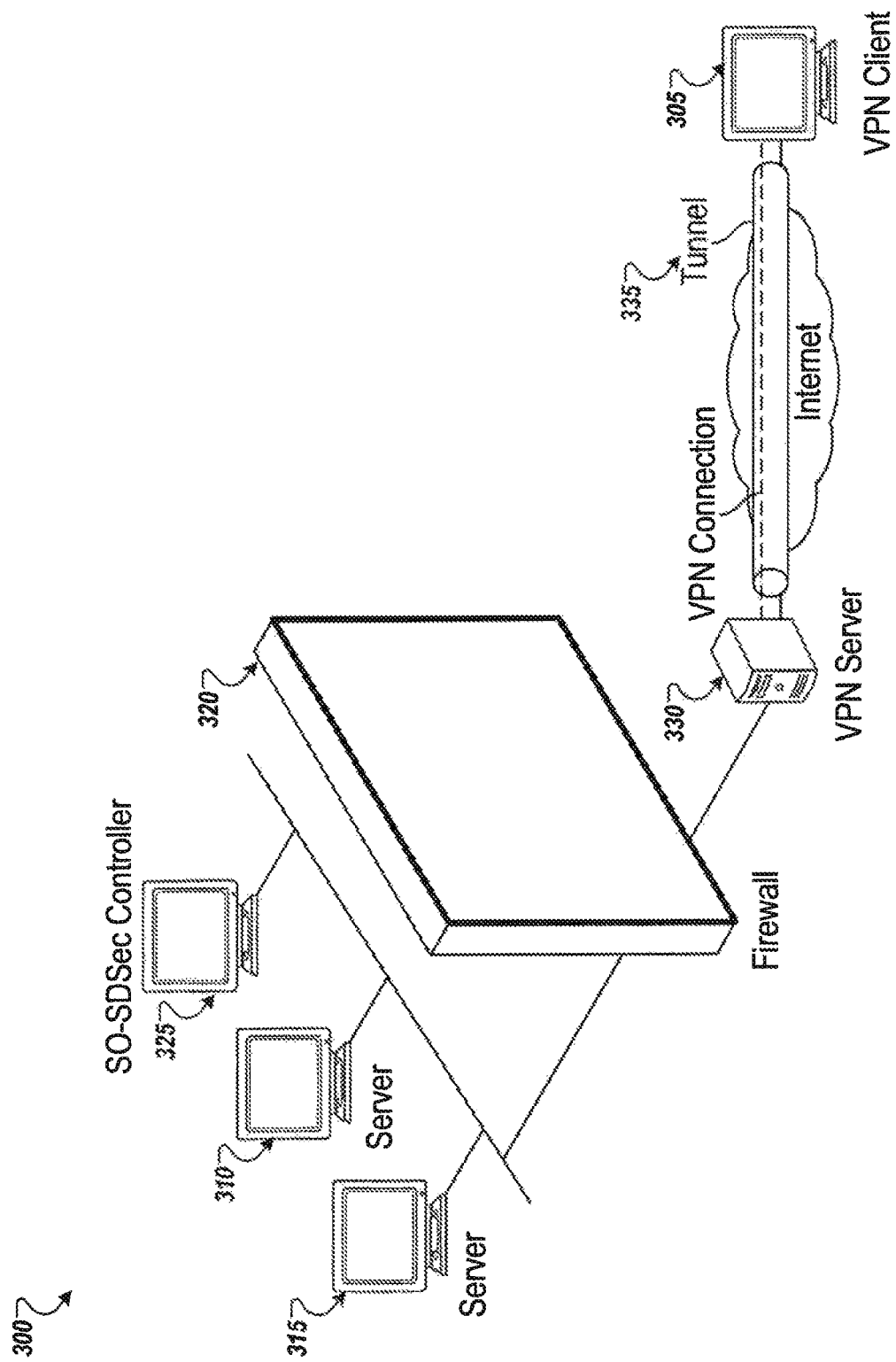
FIG. 3 illustrates an example system where an external client accessing protected internal servers through a virtual private network.

FIG. 3 illustrates an example system 300 where an external client 305 accesses protected internal servers 310 and 315 through a virtual private network. The servers are protected by a firewall 320, and the external client 305 uses a VPN connection to access servers 310 and 315.

To provide cyber security for this remote access, the SOSDSec controller 325 receives a registration request from the firewall 320, and the controller 325 registers the firewall 320 as a traffic filtering service. The controller 325 receives a registration request form the VPN server 330, and the controller registers the VPN server 330 as a secure communication service. The controller 325 receives a registration request from the internal servers 310 and 315. The controller 325 registers the servers 310 and 315 as consumers of a traffic filtering service with the parameter specifying that only traffic from the VPN server 330 is allowed. The controller 325 finds a match between the servers' service requests and the firewall's service description and creates service bindings. The controller 325 translates the service bindings into firewall commands, and sends those commands to firewall 320 to change its configuration. The client 305 sends a registration request to the controller, and the controller 325 registers the client 305 as a consumer of secure communication service. The controller 325 finds a match between the client's service request and the VPN server's service description, and creates a service binding. The controller 325 translates the service binding into VPN configurations, and sends corresponding commands to the VPN server 330. In some implementations, the above steps are completed before the client 305 attempts to connect to any server through the internet. The client 305 connects to the VPN server 330 through the internet. The VPN server 330 locates the client's record in its configuration, and proceeds to establish a secure communication tunnel 335 for the client 305. The client traffic reaches the firewall 320, which identifies the traffic as traffic from the VPN server 330, and passes it to internal servers 310 and 315.

Figure 3A:
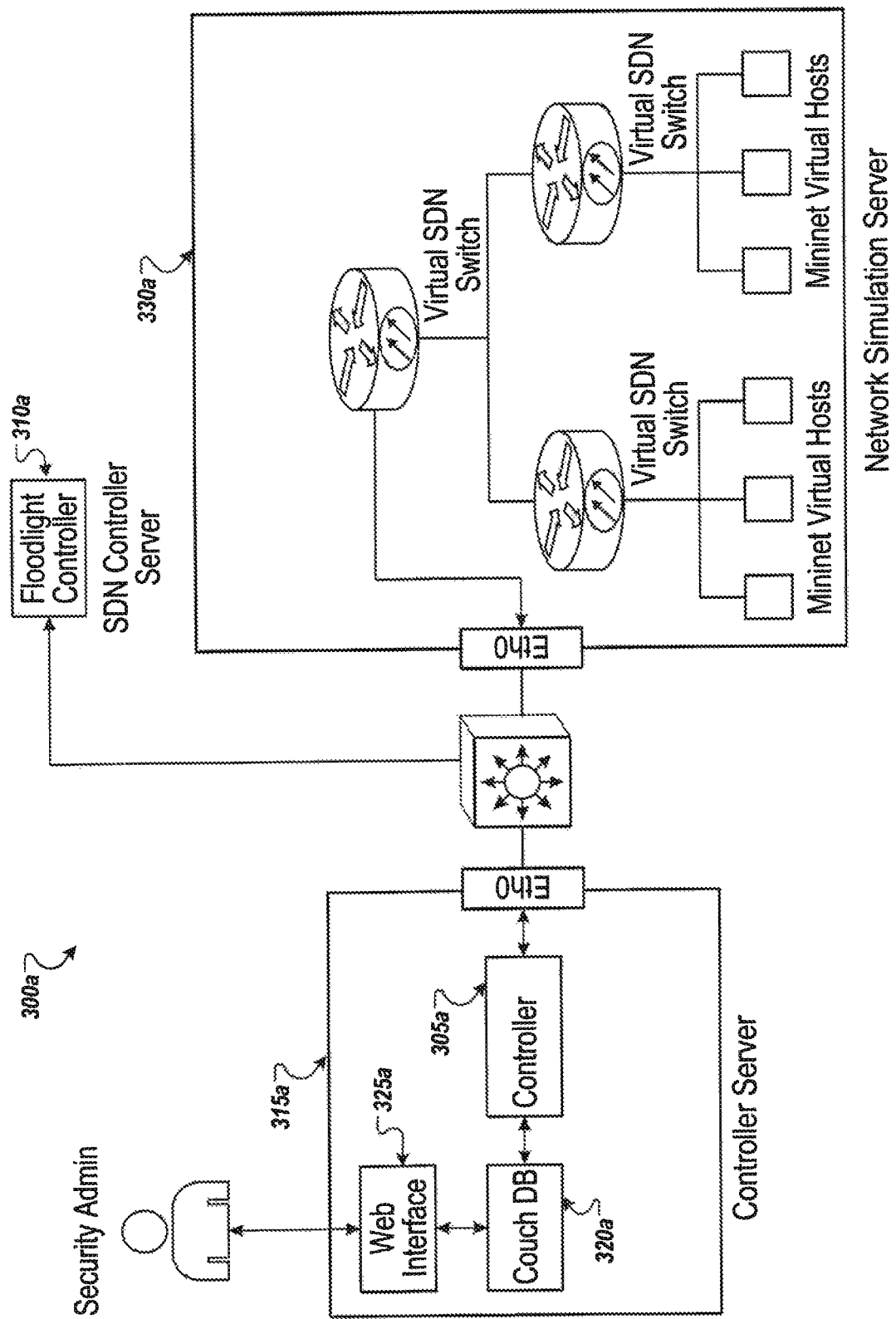
FIG. 3A illustrates an example of the SOSDSec controller and an example test bed.

FIG. 3A illustrates another example test bed 300a. The test bed 300a uses the open-source Floodlight controller as SDN controller 310a, and the open-source simulator Mininet as network simulation server. The test bed 300a consists of three servers: an SOSDSec controller server 315a that may be implemented with Python or a similar language and that includes a CouchDB database 320a, and a web interface 325a; a SDN controller server 310a running Floodlight; and a network simulation server 330a that simulates an OpenFlow network with subnets and dozens of virtual hosts, e.g. a mininet sever.

As related to portable asset security, many enterprises adopt heterogeneous security technologies in different parts of their infrastructure. It may be cumbersome to consistently enforce security policy on assets moving among these parts, because administrators often have to manually configure security controls using different technologies, a time consuming and error-prone process.

Figure 3B:
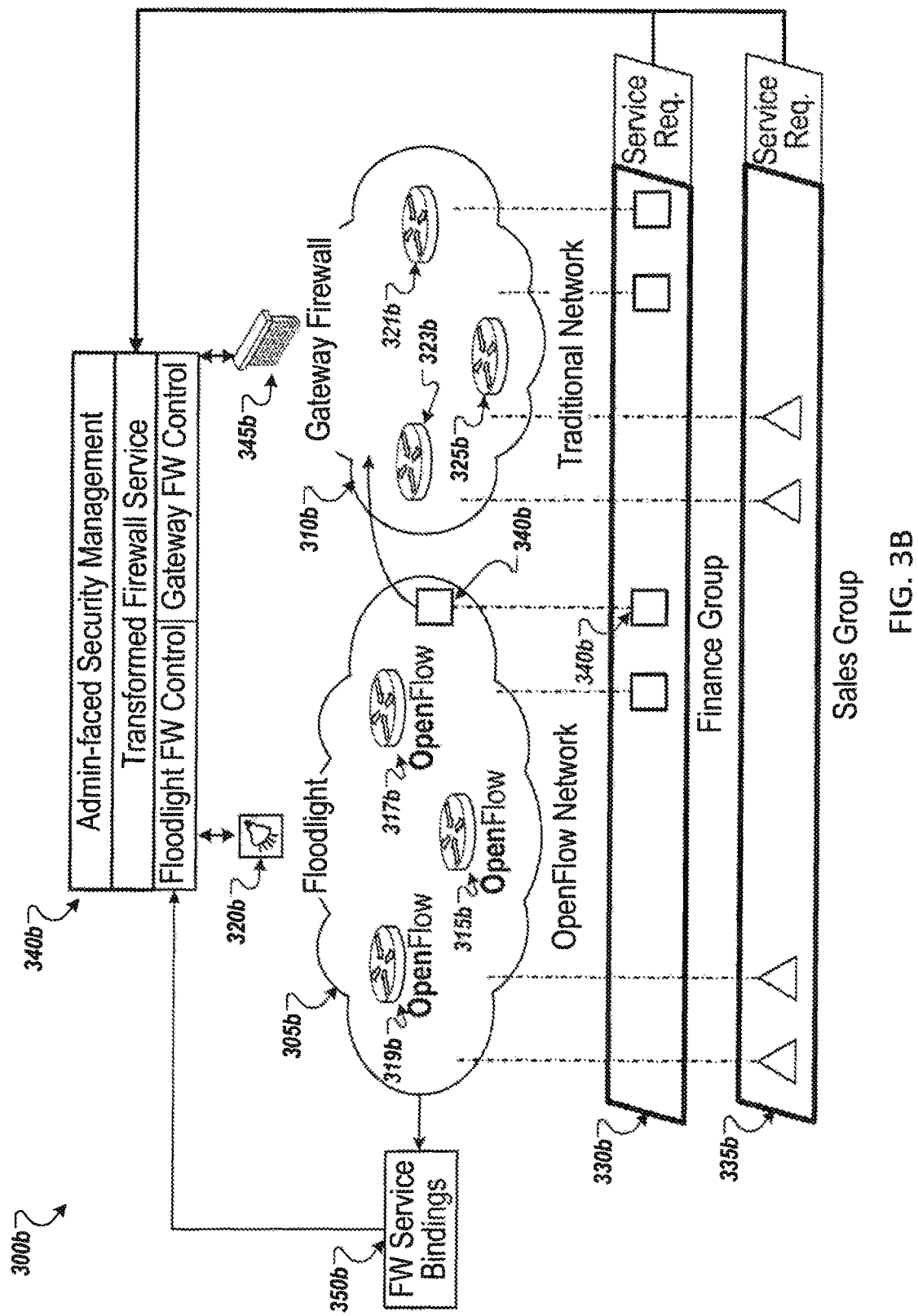
FIG. 3B illustrates two example subnets in a test bed.

FIG. 3B illustrates two example subnets 305b and 310b in the example test bed 300b. A first subnet 305b is connected by OpenFlow-enabled switches 315b, 317b, and 319b and managed by a Floodlight controller 320b. A second subnet 310b is a network connected by non-OpenFlow switches 321b, 323b, and 325b. Each subnet has a firewall function. On the OpenFlow network 305b, the firewall rules are created on the Floodlight controller 320b and pushed to all OpenFlow switches 315b, 317b, and 319b. The SOSDSec controller 340b uses the Floodlight Firewall API to call Floodlight controller's firewall functions. In the non-OpenFlow network 310b, a Linux server is used as the gateway with its firewall enabled in kernel. SOSDSec remotely calls the gateway's iptables commands to configure its firewall. Though implemented by different technologies, these two firewall controls are transformed and represented by the same firewall service in SOSDSec, and security policies and management do not need to distinguish between the two technologies. Each subnet has a number of virtual hosts created by Mininet, divided into a finance group 330b and a sales group 335b. Each group has its own access control policy, which is translated into firewall service requirements.

SOSDSec control is evaluated for portable security by moving a virtual host 340b, which belongs to the finance group 330b, from the OpenFlow network 305b to the traditional network 310b. The virtual host's group remains unchanged after the movement. In traditional security, this movement usually requires manual updates to the rules on both firewalls 320b and 345b. But in SOSDSec, this process is transparent to the administrator, since the virtual host 340b does not change its logical identity (hostname) and does not change its security requirements, even though its network identity (IP address) changes. In the background, security service bindings 350b receive the updates from the infrastructure and adjust configurations on both firewalls with technology-specific APIs. In some implementations, the same access policies of both groups are correctly enforced before and after the virtual host moved. By using logical asset identity and transformed security services, the SOSDSec controller 340b supports technology-independent security management across heterogeneous environments, and reduces the complexity of many security tasks in SDI.

Figure 3C:
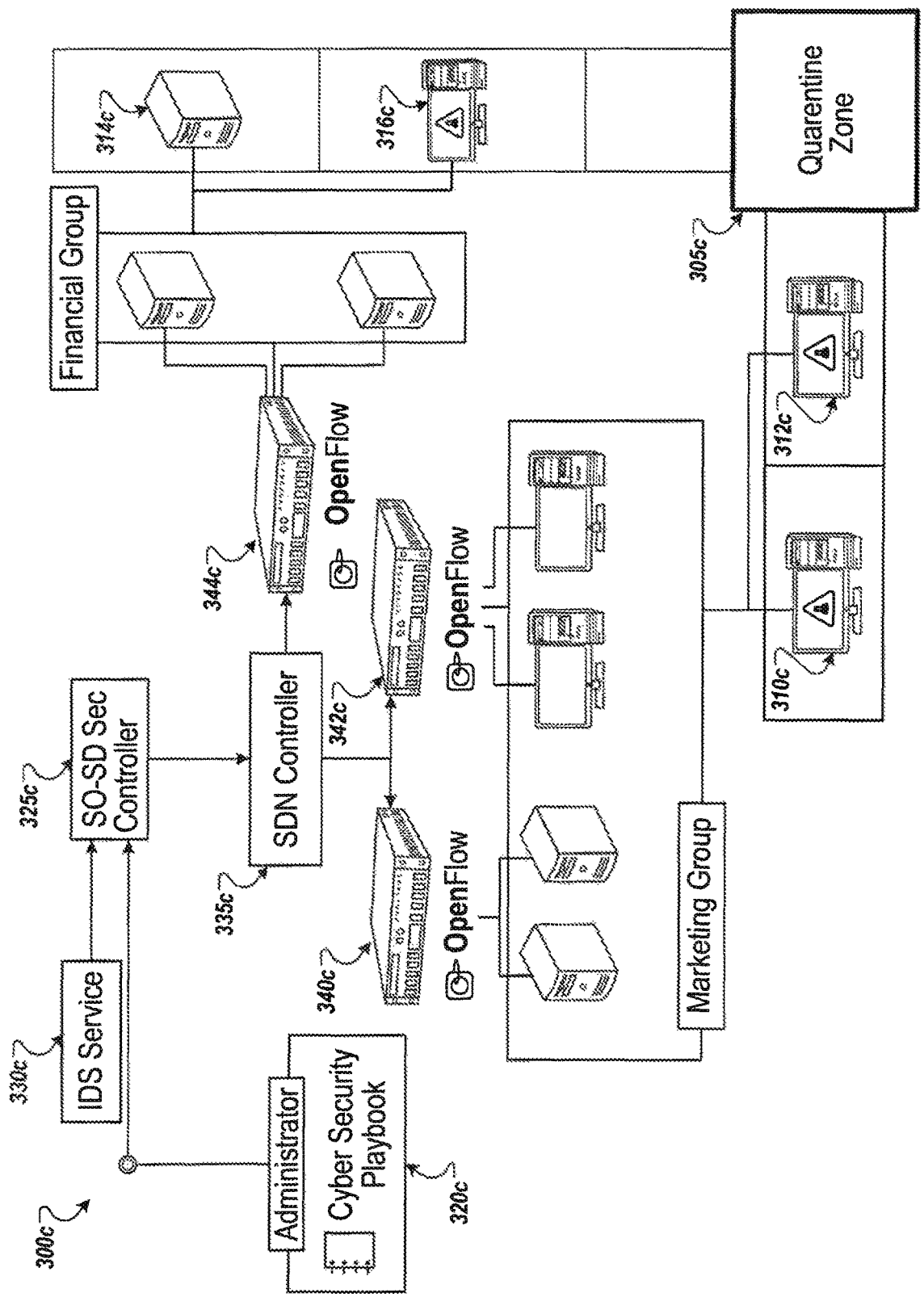
FIG. 3C illustrates an example quarantine service that is implemented with Software-Defined Networking technology that dynamically modifies access control rules based on configurable trust levels.

In yet another example use case that is related to autonomous attack containment, SOSDSec's capability of controlling more complex security operations is demonstrated. For example, SOSDSec autonomously contains attacks using playbook rules and a quarantine service. FIG. 3C illustrates an example quarantine service 300c that is implemented with Software-Defined Networking technology that dynamically modifies access control rules based on configurable trust levels. This service creates a quarantine zone 305c where assets 310c, 312c, 314c, and 316c of zero-trust level are isolated from each other and from other parts of the network. A playbook 320c keeps a collection of workflow rules that define an organization's strategy responding to certain cyber security events. To deploy autonomous attack containment with an SOSDSec controller 325c, security administrators may only need to: 1) deploy the quarantine service in the network; and 2) create a playbook rule. Below is an example playbook rule.

```
{
    "Playbook Rules": {
        "Rule 1": {
            "Event": {
                "Source": "IDS Service",
                "Type": "Trojan Detected",
                "Asset": "Any"
            }
            "Response": {
                "Add Service": "Quarantine Service"
            }
        }
    }
}
```

The example rule specifies that the SOSDSec controller 325c should react to Trojan alerts from the IDS service 330c. Further, the rule instructs that, for any asset raising a Trojan alert, the SOSDSec controller 325c modifies the asset's service requirements by adding a new request for the quarantine service.

After the rule is set, the SOSDSec controller 325c starts responding to all Trojan alerts sent by the IDS service 330c. Initially, the IDS Service 330c reports an asset on which Trojan malware or traffic has been detected. Following the playbook rule, the SOSDSec controller 325c requests a quarantine service for the compromised asset. The quarantine service binding, which ties the compromised asset and the quarantine service provider (SDN controller 335c in this case) together, is created. The service binding also sends commands to the SDN controller 335c to change relevant access control rules. The SDN controller 335c distributes the new access control rules to connected OpenFlow switches 340c, 342c, 344c. The compromised assets 310c, 312c, 314c, and 316c are effectively isolated within a logical quarantine zone 305c. Other complex security management tasks can be implemented in the same autonomous way, by dynamically modifying security requirements of protected assets.

The following descriptions of FIGS. 4-8 describe example functions of the Service-Oriented Software-Defined Security controller. The functions include security control registration, asset registration, security service request, security control command, and receiving networking or security events.

Figure 4:
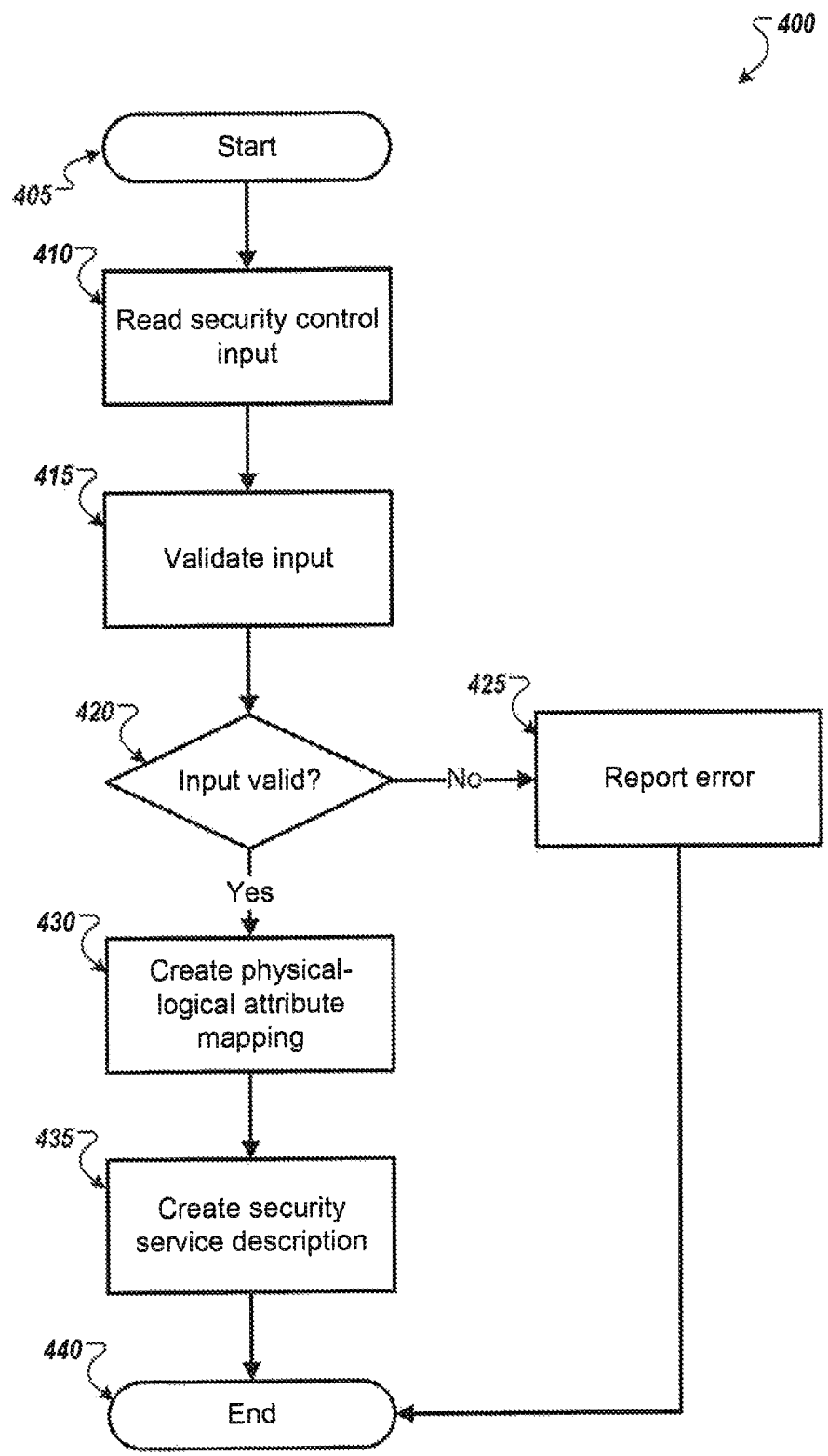
FIG. 4 illustrates an example security control registration process for Service-Oriented Software-Defined Security.

FIG. 4 illustrates an example security control registration process 400 for Service-Oriented Software-Defined Security. By following the security control registration process 400, a Service-Oriented Software-Defined Security controller registers a security control device or software. This function performs two tasks. The first task is creating the physical-logical attributes mapping for the registered security control. The second task is translating the security control's capabilities into security service description.

During the security control registration process 400, the Service-Oriented Software-Defined Security controller receives a security control name, a security control type, the security control's physical attributes and their corresponding logical attributes, and a security capacity description. The process 400 begins (405) and the controller receives the previously listed inputs, and more specifically, the security control inputs (410). The controller validates the security control input (415). If the input is not valid (420), then the controller reports an error (425), and the process 400 ends (440). If the input is valid (420), then the controller creates a physical-logical attribute mapping (430). The controller creates a security service description (435) for output and the process 400 ends (440).

Figure 5:
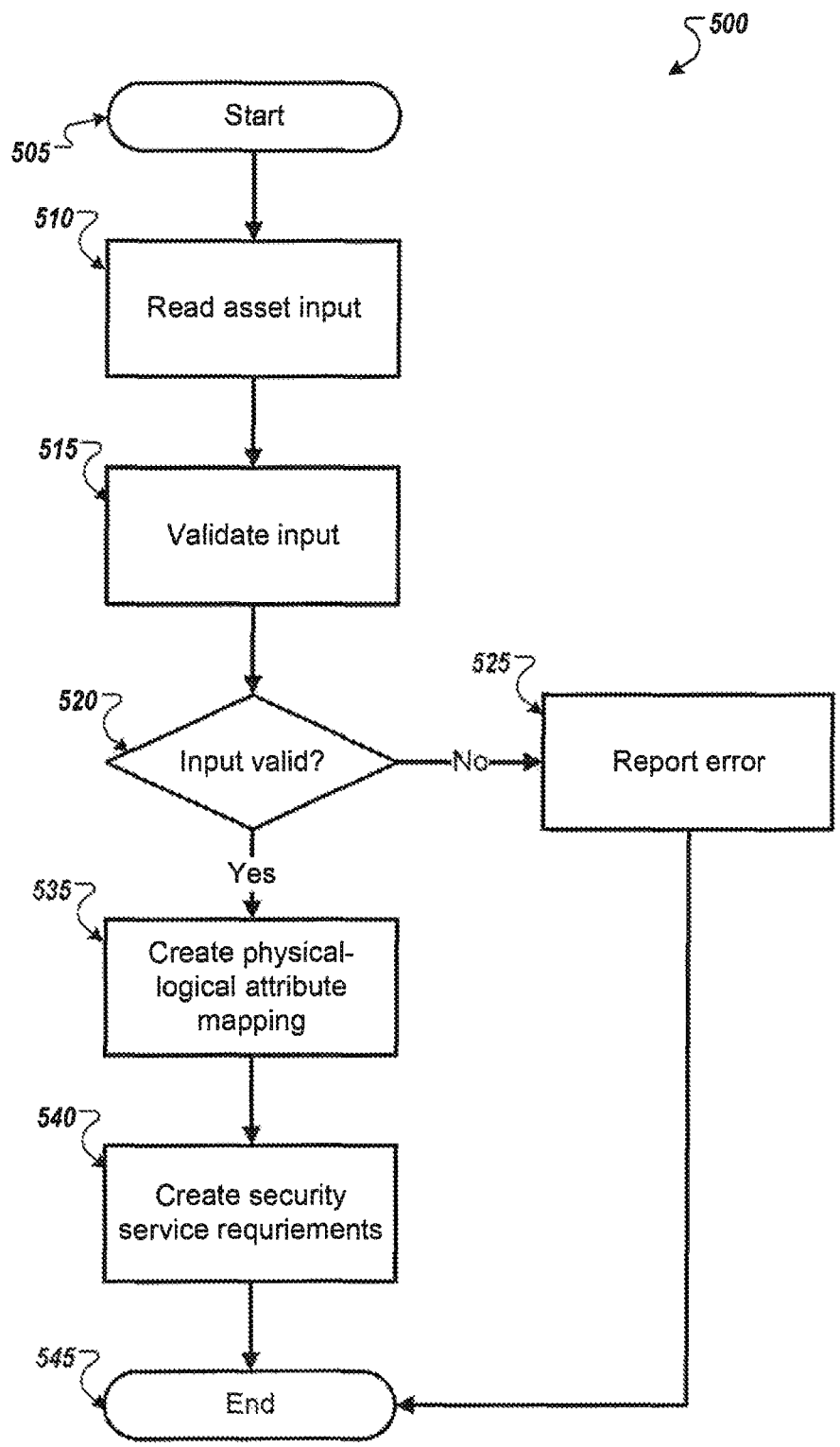
FIG. 5 illustrates an example asset registration process for Service-Oriented Software-Defined Security.

FIG. 5 illustrates an example asset registration process 500 for Service-Oriented Software-Defined Security. By following the asset registration process 500, a Service-Oriented Software-Defined Security controller registers a digital asset and its associated security policies and models with the controller. The controller then perform two tasks on the asset information. The first task is creating the physical-logical attributes mapping for the registered asset. The second task is translating the security policies and security models into service requirements.

During the asset registration process 500, the Service-Oriented Software-Defined Security controller receives an asset name, an asset type, asset physical attributes, asset logical attributes, associated security policies, and security models. The process 500 begins (505) and the controller receives, or reads, the inputs from the asset (510), for example, the previously listed inputs. The controller validates the inputs from the asset (515). If the input is not valid (520), then the controller reports an error (525), and the process 500 ends (545). If the input is valid, then the controller creates a physical logical attribute mapping (535). The controller creates a security service requirement for the asset (540) for output and the process 500 ends (545).

Figure 6:
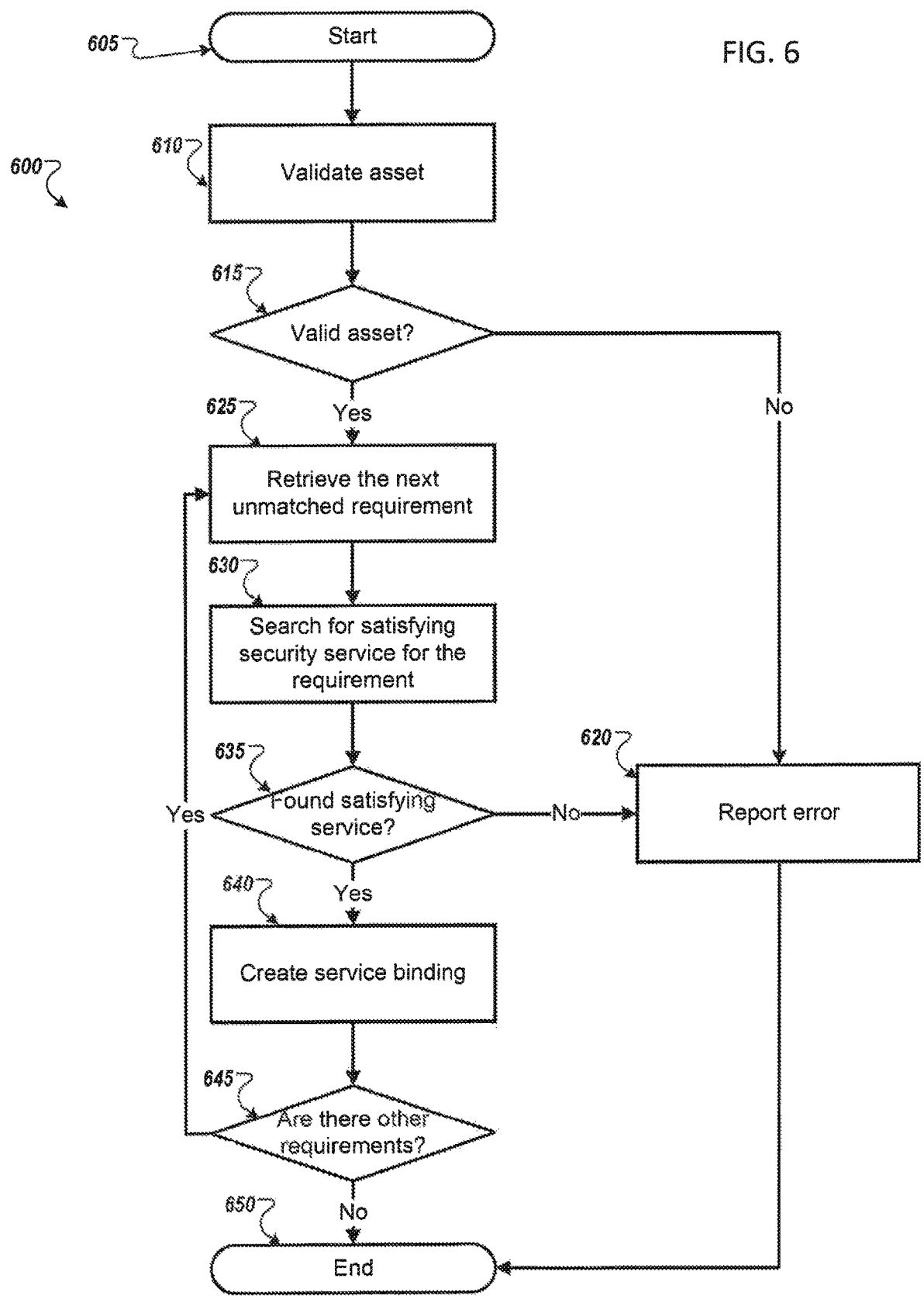
FIG. 6 illustrates an example security service request process for Service-Oriented Software-Defined Security.

FIG. 6 illustrates an example security service request process 600 for Service-Oriented Software-Defined Security. By following the security service request process 600, a Service-Oriented Software-Defined Security controller receives a request from an asset calls for security services. The Service-Oriented Software-Defined Security controller receives the request for security services and searches for security services that meet the asset's requirements.

During the security service request process 600, the Service-Oriented Software-Defined Security controller receives the asset's logical identity and the asset's one or more security requirements. The process 600 begins (605) and the controller validates the asset, e.g., the asset corresponding to the logical identity (610). If the asset is not valid (615), then the controller reports an error (620) and the process 600 ends (650). If the asset is valid (615), then the controller retrieves the next unmatched requirements (625). The controller searches a security service that satisfies the unmatched requirements (630). If the controller does not find a satisfactory security service (635), then the controller reports an error (620) and the process 600 ends (650). If the controller finds a satisfactory security service (635), then the controller creates a service binding (640) for output. If there are other unmatched requirements (645), then the controller returns to retrieve the next unmatched requirements (625). If there are no other unmatched requirements (645), then the process 600 ends (650).

Figure 7:
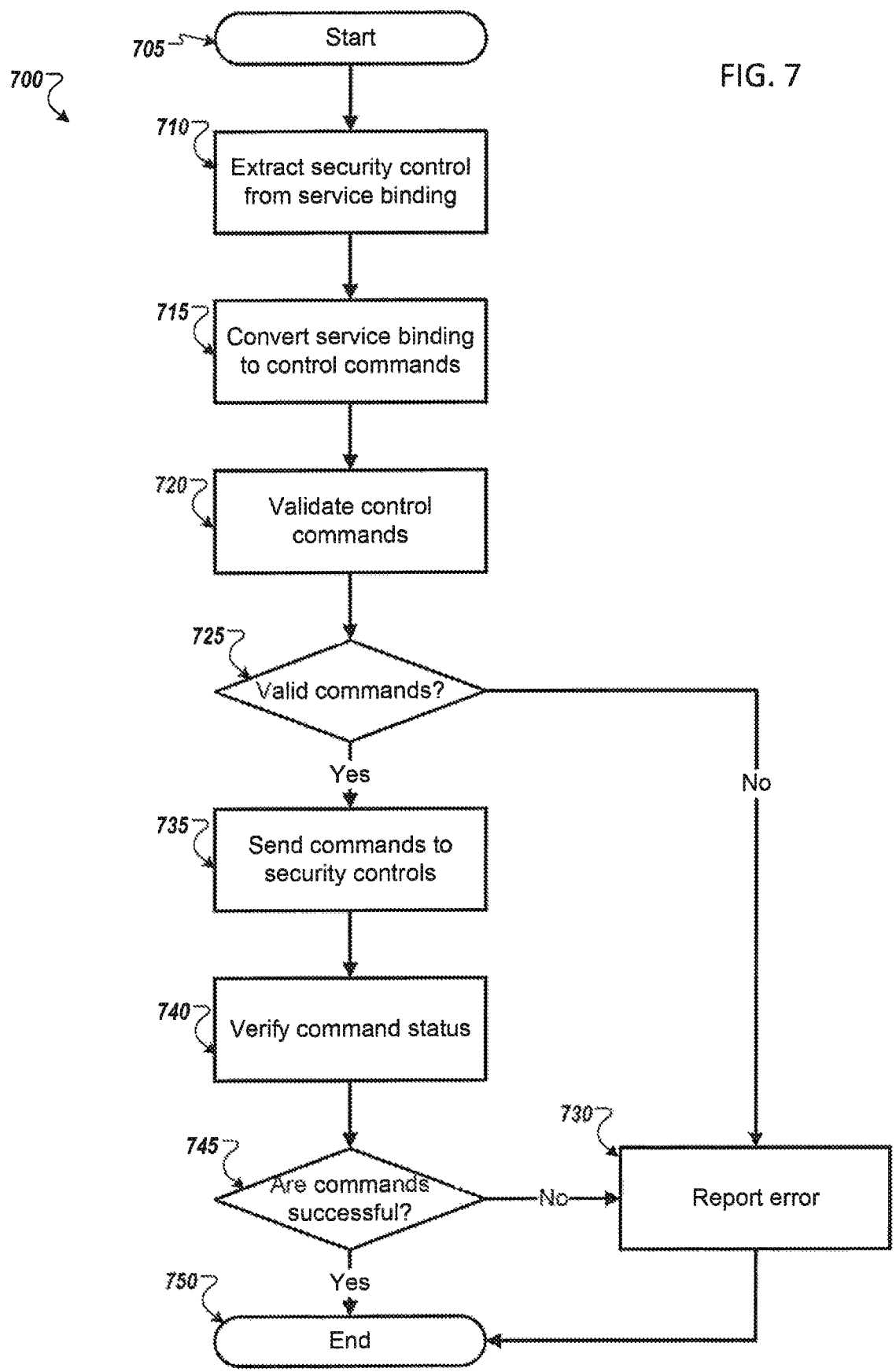
FIG. 7 illustrates an example security control command sending process for Service-Oriented Software-Defined Security.

FIG. 7 illustrates an example security control command sending process 700 for Service-Oriented Software-Defined Security. By following the security control command sending process 700, the Service-Oriented Software-Defined Security controller translates a particular security service binding into a sequence of commands for one or more security controls, and sends commands to the controls through command connectors.

During the security control command sending process 700, the Service-Oriented Software-Defined Security controller receives a security service binding. The process 700 begins (705) and the controller extracts a security control from the received security service binding (710). The controller converts the security service binding to control commands (720). The controller validates the control commands (720). If the control commands are not valid (725), then the controller reports an error (730) and the process 700 ends (750). If the control commands are valid (615), then the controller outputs the control commands to the security controls (735). The controller verifies the command status (740). If the control commands were not successful (745), then the controller reports an error (730) and the process 700 ends (750). If the control commands were successful (745), then the process 700 ends (750).

Figure 8:
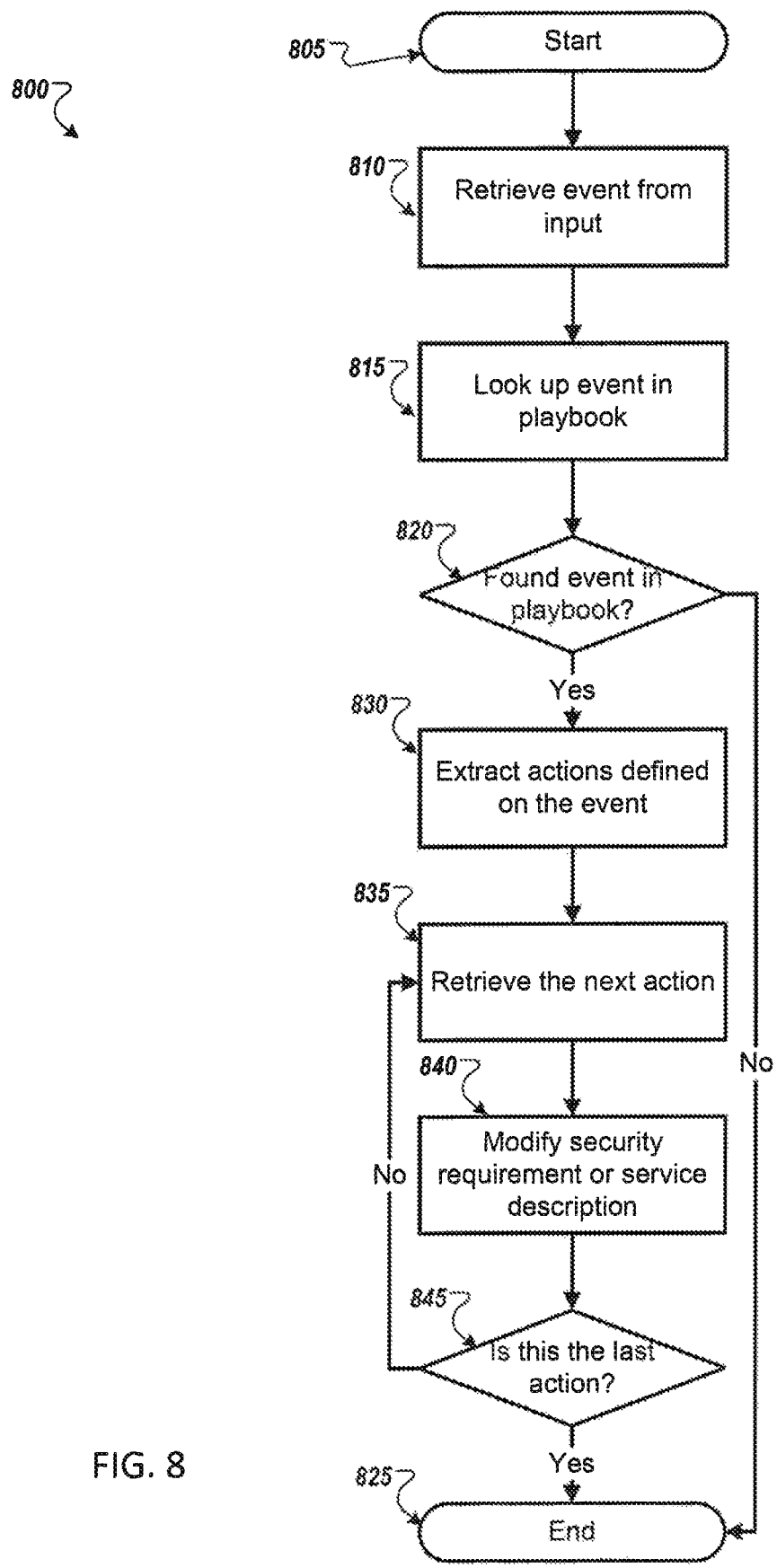
FIG. 8 illustrates an example process for receiving networking or security events for Service-Oriented Software-Defined Security.

FIG. 8 illustrates an example process 800 for receiving networking or security events for Service-Oriented Software-Defined Security. By following the process 800 for receiving networking or security events, the Service-Oriented Software-Defined Security controller receives networking or security events from event connectors. When the controller receives an event, the controller looks up the event in the playbook. If the event is a trigger defined in the playbook, the controller starts to perform a sequence of actions on the event. Each action modifies a security requirement or a service description.

During the process 800 for receiving networking or security events, the Service-Oriented Software-Defined Security controller receives data for a security relevant event. The process 800 begins (805) and the controller retrieves the event data from the input data (810). The controller looks up the event in the playbook (815). If the controller does not find the event in the playbook (820), then the process 800 ends (825). If the controller finds the event in the playbook (820), then the controller extracts from the playbook actions defined for the event (830). The controller retrieves the next action (835). The controller modifies the security requirements or the service description (840). If there are additional actions (845), then the controller returns to retrieve the next action (835). If there are no more additional actions, then process 800 ends (825).

The above description relates to SOSDSec, a service-oriented approach that implements software-defined security. It separates security management from the actual security controls and infrastructure details. It makes enterprise security more agile in the next generation of cloud environment.

In some implementations, Topology and Orchestration Specification for Cloud Applications (TOSCA) may be used. TOSCA enables portable and standardized management of cloud applications. TOSCA includes a plan concept that defines process models used to create, terminate, and manage cloud applications during their whole lifetime. It is possible to apply TOSCA plans to standardize the definition, creation, termination, and management of SOSDSec services in heterogeneous clouds.

In SOSDSec, security capabilities are transformed into modular security services that have uniform management APIs. This brings the possibility that different SOSDSec services can be chained together to provide more customized security functions to users. In some implementations, SOSDSec services may be composed and chained.

Figure 9:
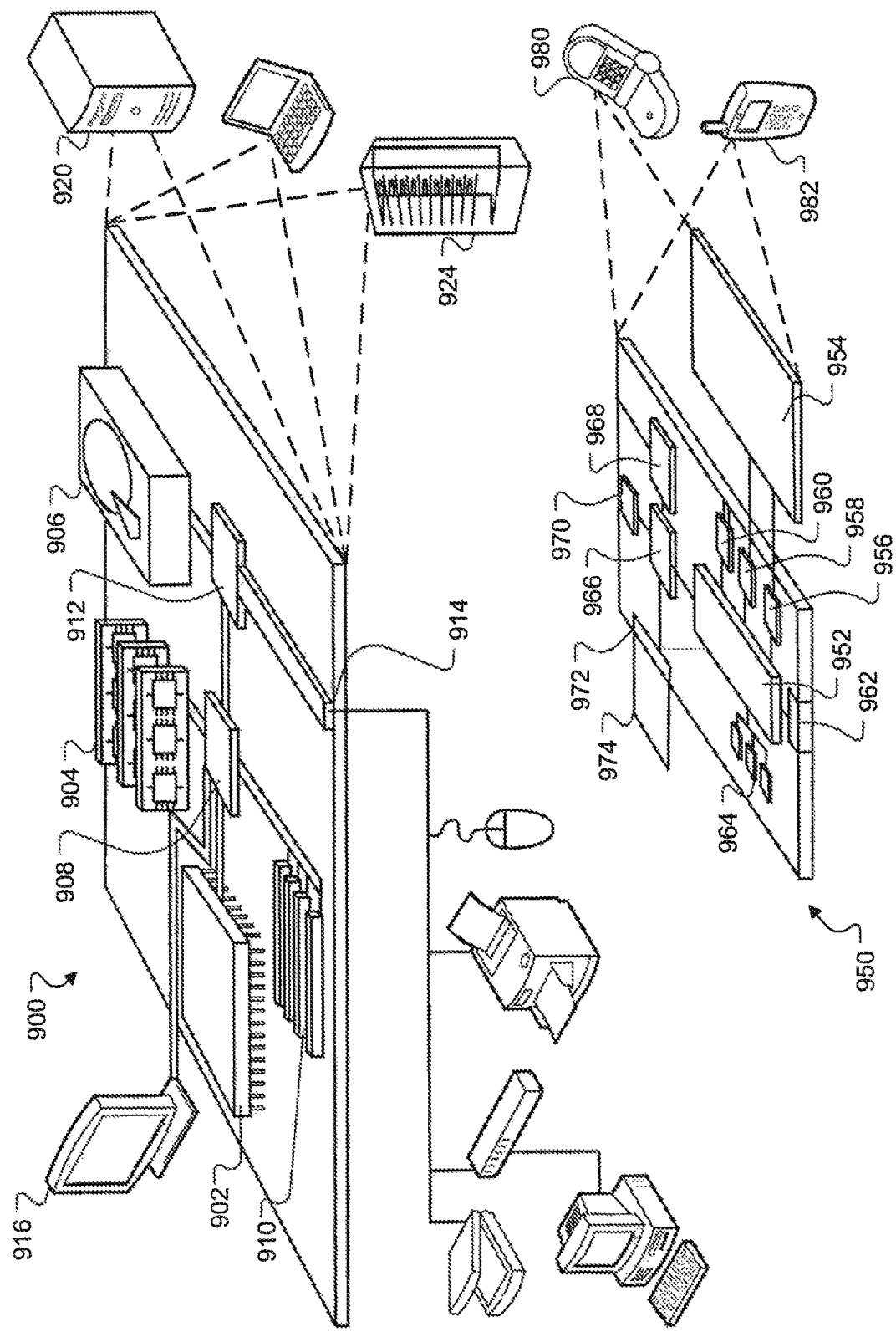
FIG. 9 illustrates an example of a computing device and a mobile computing device.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards. In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver. In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
  receiving, by a security controller that communicates with a security control device and a computing asset, data identifying a security event associated with the computing asset;
  determining, by the security controller, a logical attribute of the security control device and a logical attribute of the computing asset;
  based on the logical attribute of the security control device and the logical attribute of the computing asset, accessing, by the security controller, a security playbook that includes set of security control commands for the security controller to perform in response to the security event; and
  based on the set of security control commands:
    identifying, by the security controller, a security service binding that matches a security service requirement for the computing asset and a security service description for the security control device, the security service description for the security control device being based on a security control capacity description of the security control device, and the security service requirement for the computing asset being based on a security policy and a security model for the computing asset; and
    adjusting, by the security controller, the security service binding that matches the security service requirement for the computing asset and the security service description for the security control device by adjusting the security service description for the security control device and adjusting the security service requirement for the computing asset.

2. The method of claim 1, wherein the security event is one of an event from an intrusion detection control, a network topology change, and a server failure.

3. The method of claim 1, wherein the security control device is one of a firewall, an intrusion detection system, and an identity and access management system.

4. The method of claim 1, wherein the computing asset is one of a server, a VPN client and server, an external computing device, and a mobile computing device.

5. The method of claim 1, comprising:
  receiving data indicating a change to a physical attribute of the computing asset;
  in response to receiving the data indicating the change to the physical attribute of the computing asset, identifying, by the security controller, the security service requirement for the computing asset; and
  updating, by the security controller, the adjusted security service binding for the computing asset based on the security service requirement for the computing asset.

6. The method of claim 5, wherein the adjusted security service binding for the computing asset is updated automatically and without user input after receiving the data indicating the change to the physical attribute of the computing asset.

7. The method of claim 1, comprising:
  registering, by the security controller, the security control device by:
    creating a physical-logical attribute mapping for the security control device including an IP address-hostname mapping for the security control device; and
    generating the security service description associated with the security control device by translating the security control capacity description of the security control device; and
  registering, by the security controller, the computing asset by creating a physical-logical attribute mapping for the computing asset including an IP address-hostname mapping for the computing asset.

8. A system comprising:
  one or more computers; and
  one or more computers and one or more storage devices storing instructions that are operable, when executed by the one or more computers, to cause the one or more computers to perform operations comprising:
    receiving, by a security controller that communicates with a security control device and a computing asset, data identifying a security event associated with the computing asset;
    determining, by the security controller, a logical attribute of the security control device and a logical attribute of the computing asset;
    based on the logical attribute of the security control device and the logical attribute of the computing asset, accessing, by the security controller, a security playbook that includes set of security control commands for the security controller to perform in response to the security event; and
    based on the set of security control commands:
      identifying, by the security controller, a security service binding that matches a security service requirement for the computing asset and a security service description for the security control device, the security service description for the security control device being based on a security control capacity description of the security control device, and the security service requirement for the computing asset being based on a security policy and a security model for the computing asset; and adjusting, by the security controller, the security service binding that matches the security service requirement for the computing asset and the security service description for the security control device by adjusting the security service description for the security control device and adjusting the security service requirement for the computing asset.

9. The system of claim 8, wherein the security event is one of an event from an intrusion detection control, a network topology change, and a server failure.

10. The system of claim 8, wherein the security control device is one of a firewall, an intrusion detection system, and an identity and access management system.

11. The system of claim 8, wherein the computing asset is one of a server, a VPN client and server, an external computing device, and a mobile computing device.

12. The system of claim 8, wherein the operations comprise:

receiving data indicating a change to a physical attribute of the computing asset;

in response to receiving the data indicating the change to the physical attribute of the computing asset, identifying, by the security controller, the security service requirement for the computing asset; and updating, by the security controller, the adjusted security service binding for the computing asset based on the security service requirement for the computing asset.

13. The system of claim 12, wherein the adjusted security service binding for the computing asset is updated automatically and without user input after receiving the data indicating the change to the physical attribute of the computing asset.

14. The system of claim 8, wherein the operations comprise:

registering, by the security controller, the security control device by:

creating a physical-logical attribute mapping for the security control device including an IP address-hostname mapping for the security control device; and generating the security service description associated with the security control device by translating the security control capacity description of the security control device; and registering, by the security controller, the computing asset by creating a physical-logical attribute mapping for the computing asset including an IP address-hostname mapping for the computing asset.

15. A non-transitory computer-readable medium storing software comprising instructions executable by one or more computers which, upon such execution, cause the one or more computers to perform operations comprising:

receiving, by a security controller that communicates with a security control device and a computing asset, data identifying a security event associated with the computing asset;

determining, by the security controller, a logical attribute of the security control device and a logical attribute of the computing asset;

based on the logical attribute of the security control device and the logical attribute of the computing asset, accessing, by the security controller, a security playbook that includes set of security control commands for the security controller to perform in response to the security event; and based on the set of security control commands:

identifying, by the security controller, a security service binding that matches a security service requirement for the computing asset and a security service description for the security control device, the security service description for the security control device being based on a security control capacity description of the security control device, and the security service requirement for the computing asset being based on a security policy and a security model for the computing asset; and adjusting, by the security controller, the security service binding that matches the security service requirement for the computing asset and the security service description for the security control device by adjusting the security service description for the security control device and adjusting the security service requirement for the computing asset.

16. The medium of claim 15, wherein the security event is one of an event from an intrusion detection control, a network topology change, and a server failure.

17. The medium of claim 15, wherein the security control device is one of a firewall, an intrusion detection system, and an identity and access management system.

18. The medium of claim 15, wherein the computing asset is one of a server, a VPN client and server, an external computing device, and a mobile computing device.

19. The medium of claim 15, wherein the operations comprise:

receiving data indicating a change to a physical attribute of the computing asset;

in response to receiving the data indicating the change to the physical attribute of the computing asset, identifying, by the security controller, the security service requirement for the computing asset; and updating, by the security controller, the adjusted security service binding for the computing asset based on the security service requirement for the computing asset.

20. The medium of claim 15, wherein the operations comprise:

registering, by the security controller, the security control device by:

creating a physical-logical attribute mapping for the security control device including an IP address-hostname mapping for the security control device; and generating the security service description associated with the security control device by translating the security control capacity description of the security control device; and registering, by the security controller, the computing asset by creating a physical-logical attribute mapping for the computing asset including an IP address-hostname mapping for the computing asset.

* * * * *